July 6, 1948.  L. L. SHREIR  2,444,896

METHOD OF PRODUCING A CATALYST OF FIBROUS ASBESTOS

Filed April 21, 1943

L. L. Shreir
Inventor

By *Karl Huber*
Attorney

Patented July 6, 1948

2,444,896

UNITED STATES PATENT OFFICE 2,444,896

METHOD OF PRODUCING A CATALYST OF FIBROUS ASBESTOS

Louis Lionel Shreir, London, England, assignor to Baker & Company, Incorporated, Newark, N. J.

Application April 21, 1943, Serial No. 483,975
In Great Britain April 21, 1942

4 Claims. (Cl. 92—55)

This invention relates to the production of asbestos pads impregnated with a metallic catalyst.

The use of platinized asbestos as a catalyst is well known. The platinized asbestos is used in various forms but is commonly made into a pad by packing dry platinized asbestos in a flaky or granular condition into a container of the desired size and shape. A pad formed in this way, however, only exists as a coherent body while it is confined within the container and if removed therefrom will readily disintegrate even with careful handling.

The invention has among its objects to produce a coherent pad of asbestos impregnated with a metallic catalyst, which can be freely handled without being confined in a container or mould and without danger of disintegration.

According to the invention, a coherent pad of asbestos impregnated with a metallic catalyst, is produced by forming a sludge of the impregnated asbestos with water, depositing the sludge on to a screen constituting the bottom of a trough, forming the sludge into a suspension by the admission of water into the trough, allowing the suspension to settle to form a homogeneous layer and drying said layer to produce a coherent pad.

The ratio of water to solid in the sludge initially prepared should be between 6 to 1 and 10 to 1.

The asbestos may be impregnated with various catalytic metals, such as, for example, platinum, palladium and the other metals of the platinum group, vanadium and nickel, either alone or in combination with each other or with base metals.

The production of a platinized asbestos pad according to the invention will now be described in more detail with reference to the accompanying drawings which illustrate an apparatus which may be used to produce pads according to the invention and in which.

Figure 1:
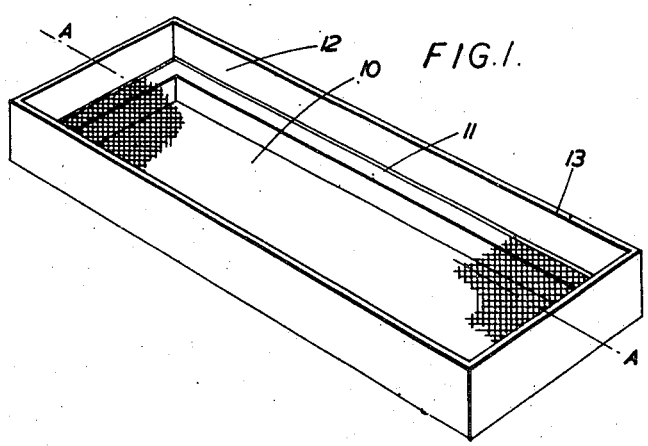
Figure 1 is a perspective view of the apparatus.
Figure 2:
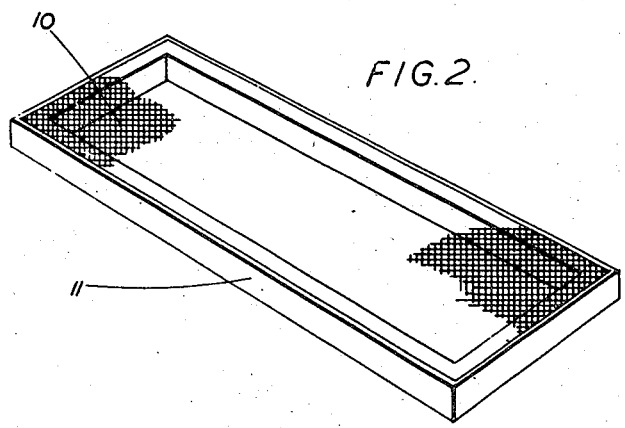
Figure 2 is a perspective view of the screen removed from the outer frame.
Figure 3:
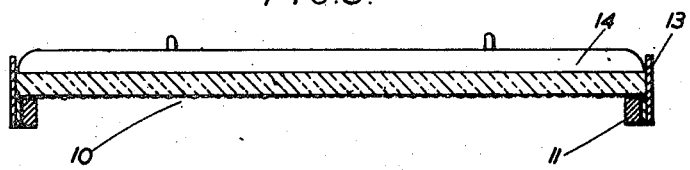
Figure 3 is a sectional view on the line A—A of Figure 1, showing in addition the asbestos pad and the means for removing surplus water by compression.

The asbestos fibre is thoroughly cleaned by boiling with 10% hydrochloric acid to remove any impurities or adulterants. It is then washed, filtered and dried at 150° C. The clean asbestos is made into a paste with sufficient platinum chloride solution to produce, after subsequent treatment, the requisite amount of platinum in the asbestos. The platinum chloride is then reduced in known manner, for example by ignition or with sodium formate and formic acid, leaving finely divided platinum dispersed throughout the asbestos mass.

The normal procedure after this is to filter, wash, dry and then break up the cakes of platinized asbestos either by machine or by hand. The platinized asbestos thus produced, which is in a granular or flaky condition, is known as "teased" asbestos.

According to the present process, however, the wet asbestos mass is washed, care being taken to prevent the material becoming compact during filtration. It is then made into a sludge with water in which the ratio of water to solid is between 6 to 1 and 10 to 1.

The sludge is then spread evenly over a layer of gauze 10 which is supported on a rectangular frame 11 and constitutes the bottom of a trough 12 which is formed by inserting the frame 11 within a slightly larger rectangular frame 13. The gauze may advantageously be of 10 mesh. The size of the frame 11 is adapted to suit the size of pad required and means are provided for connecting the space beneath the layer of gauze 10 to a suction pump. A copious stream of water is then allowed to enter the trough 12, thus forming the asbestos sludge into a suspension. The water is then allowed to drain away or if desired, is removed under suction applied beneath the frame 11. The platinized asbestos then settles, forming a homogeneous pad free from fissures. The surplus water is removed by compression by means of a block 14 of wood or other suitable material which just fits inside the frame 13. After the surplus water has been removed, the pad can be taken from the frame and dried, producing a coherent pad of platinized asbestos.

It is to be understood that the invention is not restricted to the production of rectangular pads since any desired shape of frame e. g. circular or annular, may be used depending upon the shape of pad required.

If it is desired to handle pads produced according to the invention, their strength can be increased by first placing a piece of cotton, muslin, asbestos gauze or other suitable reinforcing material upon the screen prior to the introduction of the sludge. Similarly, a piece of suitable reinforcing material is placed upon the asbestos pad before surplus water is removed by compression of the pad. In this way, the asbestos pad is held between two layers of reinforcing material. The reinforcing material may be of such a nature that it can be entirely eliminated by ignition without in any way affecting the asbestos pad, after the pad has been placed in the catalytic apparatus.

The present invention, in addition to enabling the production of a coherent asbestos pad impregnated with a metallic catalyst, as such, also provides the advantages that the necessity for "teasing" the impregnated asbestos is eliminated, the pads produced are free from dust, are more homogeneous than is possible by packing "teased" asbestos in the usual way and can be produced of any desired shape, size and thickness either as such or in situ in any suitable frame.

Another advantage of a pad produced in accordance with the present invention is the absence of binding materials and adulterants which would tend to hasten the ultimate poisoning of the catalyst. It has been found that in many oxidation reactions, a platinized asbestos pad according to the invention appears to have a greater catalytic activity and to give more consistent results than the teased material. In the oxidation of hydrocarbon vapours, there is less tendency toward leakage of unoxidised vapours.

What I claim and desire to secure by Letters Patent of the United States is:

1. The method of producing a catalyst of fibrous asbestos impregnated with metal of the platinum group formed as a coherent pad of self-sustaining shape, comprising impregnating fibrous asbestos with metal of the platinum group, forming a sludge of the impregnated asbestos with water, depositing the sludge on a screen constituting the bottom of a trough, forming the sludge into a suspension by the admission of water into the trough, removing surplus water from said suspension by drainage through said screen and allowing the suspended impregnated asbestos fibers to settle to form a homogeneous layer and drying said layer to produce a coherent pad of self-sustaining shape pervious to the free flow of the medium to be catalyzed.

2. The method according to claim 1 wherein the ratio of water to impregnated asbestos is between 6:1 and 10:1 in the formation of the sludge.

3. The method of producing a catalyst of fibrous asbestos impregnated with metal of the platinum group formed as a coherent pad of self-sustaining shape, comprising impregnating fibrous asbestos with metal of the platinum group, forming a sludge of the impregnated asbestos with water, depositing the sludge on a screen constituting the bottom of a trough, forming the sludge into a suspension by the admission of water into the trough, removing surplus water from said suspension by drainage through said screen supplemented by suction applied beneath said screen and allowing the suspended impregnated asbestos fibers to settle to form a homogeneous layer and drying said layer to produce a coherent pad of self-sustaining shape pervious to the free flow of the medium to be catalyzed.

4. The method of producing a catalyst of fibrous asbestos impregnated with metal of the platinum group formed as a coherent pad of self-sustaining shape, comprising impregnating fibrous asbestos with metal of the platinum group, forming a sludge of the impregnated asbestos with water, depositing the sludge on a screen constituting the bottom of a trough, forming the sludge into a suspension by the admission of water into the trough, removing surplus water from said suspension by drainage through said screen supplemented by compression and allowing the suspended impregnated asbestos fibers to settle to form a homogeneous layer and drying said layer to produce a coherent pad of self-sustaining shape pervious to the free flow of the medium to be catalyzed.

LOUIS LIONEL SHREIR.

REFERENCES CITED

The following references are of record in the file of this patent:

UNITED STATES PATENTS

| Number | Name | Date |
|---|---|---|
| 571,580 | Sputh | Nov. 17, 1896 |
| 674,774 | Kelly | May 21, 1901 |
| 956,832 | Seitz | May 3, 1910 |
| 980,158 | Kaiser | Dec. 27, 1910 |
| 1,193,798 | Landis | Aug. 8, 1916 |
| 1,698,009 | Weber | Jan. 8, 1929 |
| 1,966,553 | Kropp | July 17, 1934 |
| 2,166,266 | Schmitt | July 18, 1939 |
| 2,175,715 | Danning | Oct. 10, 1939 |
| 2,197,805 | Lovett | Apr. 23, 1940 |
| 2,326,523 | Connolly et al. | Aug. 10, 1943 |

FOREIGN PATENTS

| Number | Country | Date |
|---|---|---|
| 364,342 | Great Britain | Jan. 7, 1932 |
| 382,472 | Great Britain | Oct. 27, 1932 |

OTHER REFERENCES

Technical Association Papers Series 23 (1940) page 201.

Catalysis by Berkman et al. (1940) pages 467 and 468.